United States Patent [19]
Newton

[11] Patent Number: 4,682,733
[45] Date of Patent: Jul. 28, 1987

[54] THRUST REVERSER

[75] Inventor: Arnold C. Newton, Derby, England

[73] Assignee: Rolls-Royce plc, London, England

[21] Appl. No.: 797,017

[22] Filed: Nov. 12, 1985

[30] Foreign Application Priority Data

Dec. 13, 1984 [GB] United Kingdom ............... 8431556

[51] Int. Cl.[4] .............................................. F02K 1/62
[52] U.S. Cl. ............................ 239/265.39; 239/503; 239/512; 60/230
[58] Field of Search ............. 239/507, 265.33, 265.35, 239/265.39, 265.37, 265.27, 265.29, 265.23, 265.19, 503, 512; 60/230, 232

[56] References Cited

U.S. PATENT DOCUMENTS

| | | | |
|---|---|---|---|
| 2,523,842 | 9/1950 | Ouliaroff | 239/265.19 X |
| 2,735,264 | 2/1956 | Jewett | 239/265.37 |
| 2,963,858 | 12/1960 | Lovett, Jr. | 239/503 X |
| 2,975,593 | 3/1961 | Bauger et al. | 239/507 |
| 3,015,936 | 1/1962 | Brewer et al. | 239/265.19 |
| 3,016,700 | 1/1962 | Howald | 239/507 |
| 3,266,734 | 8/1966 | Gahagan et al. | 60/230 X |
| 3,568,792 | 3/1971 | Urquhart | 239/268.19 X |
| 3,856,239 | 12/1974 | Leibach | 60/230 X |
| 3,984,974 | 10/1976 | Medawar et al. | 60/230 |

Primary Examiner—Andres Kashnikow
Assistant Examiner—Mary Beth D. Jones
Attorney, Agent, or Firm—Cushman, Darby & Cushman

[57] ABSTRACT

A thrust reverser for a gas turbine engine of the type to power an aircraft, the thrust reverser comprising a first pair of half round doors nesting in a second pair of half round doors and both being pivoted on an axis extending diametrically of a jet pipe for the gas turbine engine. Each of the first pair of half round doors having a downstream edge which has a scarfed portion thereon and each of said second pair of half round doors having a downstream edge which is fully scarfed, the scarfed portion of said first pair of half round doors and the scarfed edges of said second pair of half round doors abutting when said doors are in a thrust reversing position with said second pair of half round doors preventing axial spillage of efflux. When said first pair and said second pair of half round doors are in non-thrust reversing position, said first pair of half round doors forming a greater portion of a nozzle throat and said scarfed portions of the downstream edges thereof reducing side spillage of efflux.

2 Claims, 2 Drawing Figures

THRUST REVERSER

This invention relates to thrust reversers for gas turbine engines of the kind which power aircraft.

More specifically, the invention relates to a thrust reverser which in an inoperative position, defines the throat of the turbine engine exhaust nozzle, though it would also be efficacious in a construction in which other structure defines the throat.

The invention will now be described, by way of example and with reference to the accompanying drawings in which.

Figure 1:
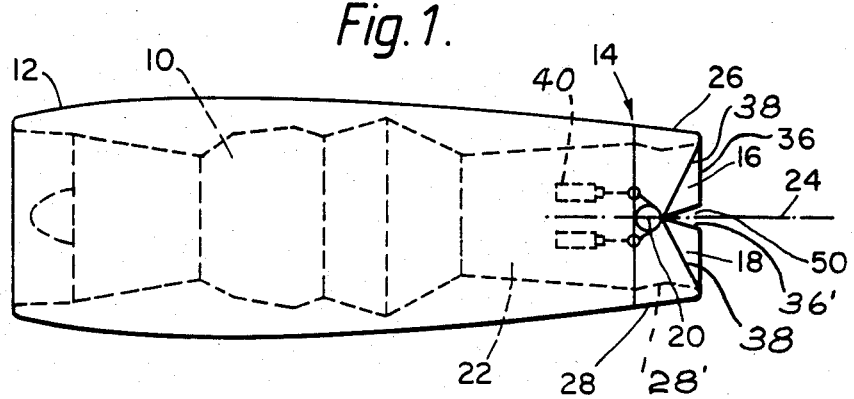
FIG. 1 is a diagrammatic view of a gas turbine engine incorporating an embodiment of the present invention.

In FIG. 1, a gas turbine engine 10 is enclosed in a streamlined cowl 12. The gas turbine engine 10 terminates at its downstream end in an exhaust nozzle 14.

The exhaust nozzle 14 is defined by a first pair of half round doors 16 and 18, each of which is connected for pivoting movement about an axis 20 which is arranged diametrically of a jet pipe 22, to positions wherein they abut on the centreline 24 of the gas turbine engine 10.

A second pair of half round doors 26 and 28 surround the downstream end of the jet pipe 22 and the first pair of doors 16 and 18. The second pair of doors 26 and 28 are also connected for pivotal movement about the axis 20, to positions in which they abut on the centreline 24 of the engine 10.

Figure 2:
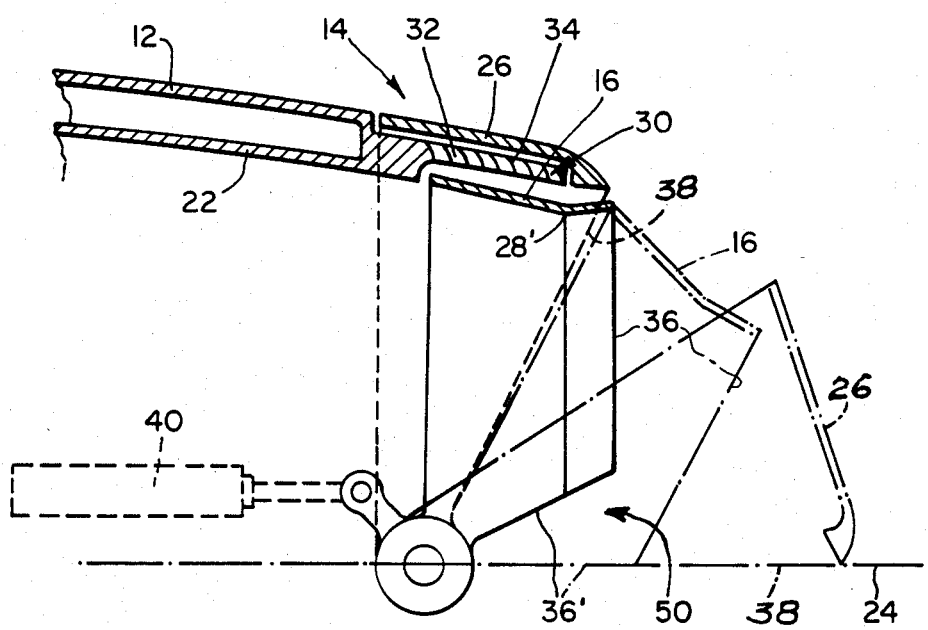
FIG. 2 is an axial, cross sectional part view of the engine FIG. 1.

Referring to FIG. 2 in which only one half door 16 and one half door 26 are shown for convenience, it being understood that their respective cooperating halves will adopt mirror image positions thereto each time half doors 16 and 26 are moved.

When in their non-thrust reversing position, the first pair of doors 16 and 18 provide a continuation of the gas flow surface of the jet pipe 22, and further, define the throat 28' of the exhaust nozzle 14.

Similarly, the second pair of doors 26 and 28 when in their non-thrust reversing position, form a continuation of the ambient airflow surface of the cowl 12.

In the present example, the downstream ends of the jet pipe 22 and the cowl 12 are recessed to provide a common, relatively thin extension 30 which rests between the first pair of doors 16 and 18 and the second pair of doors 26 and 28. The extension 30 has a number of apertures 32 therein, which contain a number of flow reversing cascades 34 (FIG. 2).

Each half door 16 and 18 is scarfed along a portion of its downstream edge 36 as indicated at 36'. The magnitude of the angle of the scarf is such that the doors 16 and 18 can pivot from the position shown in full lines, to the position shown in claim dotted lines, whereupon their scarfed edges 36 abut.

The downstream edges 38 of the doors 26 and 28 are scarfed over their full length and can thus pivot to the position indicated by chain dotted lines, wherein their scarfed edges 36 abut on the engine centreline 24.

In each case, the doors 16 and 18 and the doors 26 and 28 are pivoted by the actuation of respective pairs of rams mounted between the jet pipe 22 and the cowl 12. One such ram 40 is depicted and is connected to pivot the half door 16 which is shown.

When the doors 16 and 18 and the doors 26 and 28 are pivoted to those positions shown in chain dotted lines, they cooperate to block the flow of exhaust gases from the jet pipe 22 without axial spillage of efflux and divert them to the cascades 34. In turn, the cascades 34 impose a forwardly directed force on the gases and reverse thrust is thus achieved.

By utilising two pairs of half doors for the purpose of blocking the exhaust flow, rather than one pair of appropriately larger proportions, manufacture is considerably eased. More importantly however, when the two pairs of half doors 16 and 18 and 26 and 28 are in their non-thrust reversing positions, as shown in full lines in both FIGS. 1 and 2, the small angle of the scarfed portions 36' of downstream end edges 36 ensures that the resulting gap 50 is correspondingly small and thus considerably reduces spillage of exhaust gases with its consequent reduction in thrust.

I claim:

1. A thrust reverser suitable for use on a gas turbine engine comprising a first pair of half doors and a second pair of half doors, said second pair of half doors having fully scarfed downstream edges, said first pair of half doors nesting within said second pair of half doors when non operative and having downstream edges which include relatively small scarfed portions, said first pair of half doors, when all of the half doors are in a non thrust reversing position, defining a greater portion of a nozzle throat with said small scarfed portions reducing side spillage of efflux, the first and second half doors being interconnected on a common axis for arcuate movement into positions where respective pairs abut each other along their scarfed edges and in operation on a gas turbine engine achieve reversal of the thrust therefrom without axial spillage of efflux.

2. A thrust reverser as claimed in claim 1 wherein the exhaust duct as an extension at its downstream end which includes cascade vanes arranged peripherally thereof and the extension lies between the first pair of half doors and the second pair of half doors when said doors are in their non thrust reversing positions.

* * * * *